United States Patent [19]

Warncke et al.

[11] 4,111,197
[45] Sep. 5, 1978

[54] RESPIRATORY DEVICE COUPLING CONSTRUCTION

[75] Inventors: Ernst Warncke; Manfred Gdulla, both of Lübeck, Germany

[73] Assignee: Drägerwerk Aktiengesellschaft, Germany

[21] Appl. No.: 770,371

[22] Filed: Feb. 22, 1977

[30] Foreign Application Priority Data

Mar. 5, 1976 [DE] Fed. Rep. of Germany ....... 2609034

[51] Int. Cl.$^2$ ............................................... A62B 7/00
[52] U.S. Cl. .................................. 128/142.4; 128/142.2
[58] Field of Search ............ 128/142.2, 142 R, 141 R, 128/141 A, 142.7, 147, 146, 191 R, 247, DIG. 26; 285/385, 308, 319

[56] References Cited

U.S. PATENT DOCUMENTS

| | | | |
|---|---|---|---|
| 1,770,669 | 7/1930 | Martinet | 285/308 |
| 2,021,241 | 11/1935 | Mall | 285/308 |
| 2,156,852 | 5/1939 | Horak | 128/142.6 |
| 2,820,457 | 1/1958 | Phillips | 128/DIG. 26 |
| 2,951,714 | 9/1960 | Carlberg | 285/319 |
| 3,308,815 | 3/1967 | Wilcox et al. | 128/142 R |
| 3,433,222 | 3/1969 | Pinto | 128/142.2 |
| 3,753,582 | 8/1973 | Graham | 285/305 |

Primary Examiner—Robert W. Michell
Assistant Examiner—Henry J. Recla
Attorney, Agent, or Firm—McGlew and Tuttle

[57] ABSTRACT

A respiratory device coupling construction comprises a device which is used for respiration and which contains a cylindrical receiving recess for a connection such as a breathing gas connection. The connection or coupling includes a connector for a conduit of the gas which has a tubular portion which is insertable into the receiving recess. A tubular cover member overlies the cylindrical receiving portion and has a slot therethrough. A U-shaped locking spring has a web portion with an actuating part which is displaceably positionable in the slot so as to project from the cover member for engagement by a person's hand. The U-shaped locking spring includes two leg portions which straddle the tubular portion. Respective legs engage in respective slots on diametrically opposite sides of the tubular portion of the connecting device and the ends of these legs engage against a camming surface defined at the edge of the slot on the tubular portion. When the actuating part is depressed by a person's hand, the cam springs the leg portions outwardly to release the tubular portion for disconnection. When the actuating part is released, the leg portions spring into the slots and hold the tubular portion in the cylindrical receiving recess.

3 Claims, 3 Drawing Figures

RESPIRATORY DEVICE COUPLING CONSTRUCTION

FIELD AND BACKGROUND OF THE INVENTION

This invention relates in general to the construction of respiratory devices and, in particular, to a new and useful quick coupling device for use with such respirators, particularly for the attachment or detachment of a breathing gas.

DESCRIPTION OF THE PRIOR ART

The present invention relates to a connection for a respiratory device which is equipped with a locking mechanism comprising a locking spring. Respiratory devices and respiratory connections are usuaully attached to each other by means of "Connections for respiratory devices according to DIN 3183". Such standards include a central connection comprising a central connecting screw and a round thread connection comprising a screw thread. However, even though these connections make it possible to establish connection between the respiratory device and the connecting part in a simple manner, they have the disadvantage that when the mask is already on, it is difficult to bring them into engagement. It takes a relatively long time for the user of the device to bring the two connecting parts into axial alignment; that is in such alignment that they can be correctly engaged with each other. In action, it frequently happens that the mask which is already on is employed merely as a face protection. The respiratory device is only attached subsequently when toxic smokes are encountered. It will be understood that the connection must be effected very rapidly in such instances.

It is well know to design the connecting part of the flexible tube of a respiratory device in the form of an engaging bayonet lock and to provide a corresponding match on the connecting part of the protective mask. Such a slide lock, however, involves the risk that upon a torsion of the flexible tube which may occur in normal activity, the bayonet lock is unintentionally disengaged and the flexible tube falls off (British Pat. No. 901,260).

Also known is a coupling for detachably connecting respirators, in which the connecting part of the protective mask comprises a seal ring which bears resiliently against the connecting part and a radially moving ball or lever lock which is actuated by a rotatable arresting ring. The tubular connecting piece terminates in a flange or collar behind which the arresting means of the connecting part engages. A sealing contact is thereby established between the front side of the flange or collar and the seal ring. Because of the great number of individual parts, this coupling is expensive to manufacture and is susceptible to troubles in service. Also, it is relatively bulky. Both hands are needed for the coupling operation which may lead to difficulties in emergency situations. (German Pat. No. 1,802,814).

A lungs demand valve for respiratory and diving devices is also known. This valve is mounted on a protective breathing mask and is provided with a connection for a pressure tubing through which the nutrient gas is fed. The valve housing comprises two parts, one with the valve seat, and the other with the connecting piece, which are connected gas-tightly to each other. The housing is sealed off by means of a circular seal and inserted, coaxially and for rotation, in a receiving housing which is joined to the respiratory device or the protective mask. For securement, a locking spring is provided, by which the receiving housing and the valve housing are connected to each other. To this end, the locking spring is put through openings provided in the receiving housing, whereby, the valve housing is held in place within the receiving housing and remains rotatable since the spring is guided in a circular groove. The locking spring is held in this position due to its resilience. It is difficult, however, to apply this design universally, since in order to disengage the connection, the locking spring must always be removed and handled as a loose individual part. For re-engagement, the parts must be brought into matching position, in order to be able to put the locking spring through. This is very complicated, particularly under the pressure of time, and unsuitable in instances where the connection is to be effected subsequently with the mask put on. (German Utility Model No. 1,923,228).

SUMMARY OF THE INVENTION

The present invention provides a connection for respiratory devices which makes it possible to effect the desired connection or disconnection easily, rapidly and securely, even in dangerous situations, for example, with a protective mask already being worn by a wearer, with toxic gases occurring subsequently. The connection is space-saving and simple in manufacture and maintenance.

In accordance with the invention, a connection is provided in which a locking spring is used which comprises a shoulder and two legs, of which the shoulder remains outside the connecting part, but within the range of an unlocking stroke, while the ends of the legs rest against butting surfaces limiting openings which are provided in the connecting part, and the connecting tube comprises a portion having a reduced diameter and a portion having a larger diameter and a transition neck therebetween and is provided with a circular groove for receiving the legs of the springs.

The principal advantage of this design is that the connection can be effected, without further manipulation, merely by introducing the connecting tube of the respiratory device axially into the connecting part, for example, of the protective mask. In a mechanically simple manner, the connecting tube is designed so that while being introduced into the connecting part, the legs of the locking spring, which is a component part of the connection, are pushed apart and, thereupon, in the end position of the tube, snap back, under their own resilience, into the circular groove of the connecting tube, thereby locking the connection. The unlocking is equally simple and reliable in operation. By pushing the shoulder of the locking spring inwardly into the connecting part, the correspondingly shaped ends of the legs slide on the butting surfaces of the openings outwardly and move out of the circular groove. It will be readily understood that this design ensures a connection of the respiratory device to the protective mask even in dangerous situations. The required space and the weight are small. Also, the manufacture is inexpensive and the maintenance is simple.

A development of the invention provides a pushbutton which is guided in a slot of a circular cover ring and applies against the shoulder of the locking spring. With this design, the unlocking is simplified in particular conditions of use, for example, while the user wears gloves.

In the preferred embodiment, the butting surfaces and the ends of the legs for unlocking the connection have inclinations which are equal to each other which are inclined so that, upon actuating the locking spring, they cause the legs to move outwardly. This ensures that the motion of the locking spring for unlocking the connection remains within the narrowest allowance for the paths of the legs. Thus, this design provides a further security in operation of the connection.

Accordingly, it is an object of the invention to provide a quick coupling connection for connecting a tubular portion of a connecting apparatus, such as a gas supply into a cylindrical recess of a respirator, which includes a tubular cover portion which overlies the cylindrical portion of the respirator which has a slot providing a mounting for a handle actuating part of a U-shaped locking spring which has legs which are swung into engagement in slots on diametrically opposite sides of the tubular portion and which have legs which bear against cam surfaces at the edges of the respective slots so that the spring legs may be sprung outwardly from the slots by engagement of the hand actuating part when it is desired to release the tubular portion from the cylindrical receiving recess and separate the connecting apparatus from the respirator.

A further object of the invention is to provide an apparatus for quickly connecting and disconnecting apparatus, such as a filter or breathing gas line, etc., which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
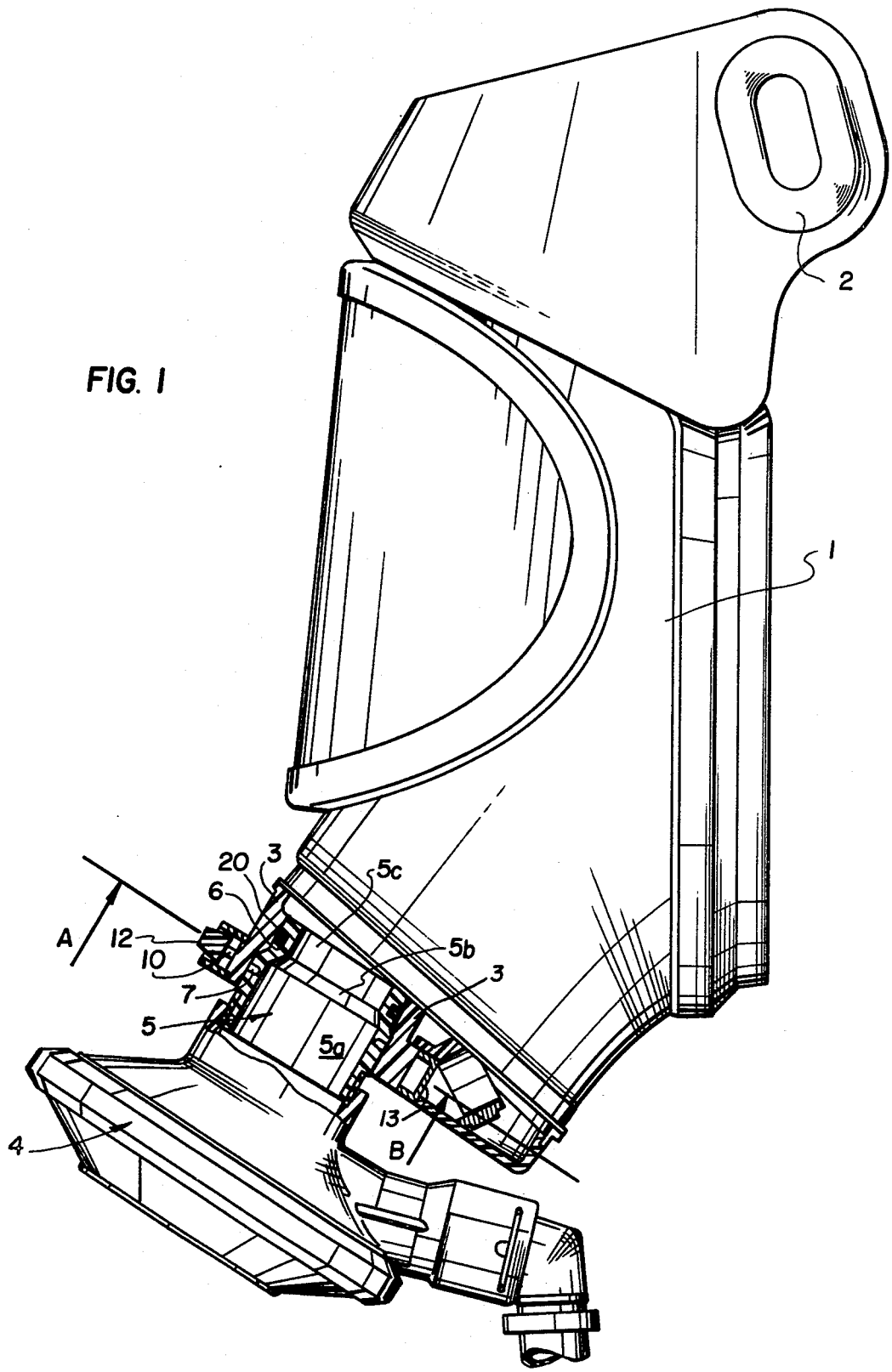
FIG. 1 is a side elevational view, partly in section, of a respirator having a quick connecting device for supplying a breathing gas to the inlet of a face mask respirator, constructed in accordance with the invention.

Referring to the drawings in particular, the invention embodied therein, comprises a protective breathing mask 1 having a strap or retaining holders 2 for securing the mask on the user's head or protective helmet, and a tubular connecting part 3 for attaching a respiratory device or a filter to the mask 1. In the example shown, the part to be attached is a lungs demand valve 4 of a respiratory apparatus. The lungs demand valve 4 has a connecting tube 5 with a large diameter part 5a having a large outside diameter which is provided with a groove 7. The portion 5a is joined through a neck 5b to a portion 5c, having a reduced diameter, which is provided with a groove 6, carrying a seal 20. Connecting part 3 is provided with two diametrically opposite openings or slots 17. With tube 5 completely inserted, and the neck portion 5b abutting against the matching surface in connecting part 3, the openings 17, 17 are positioned exactly in front of a groove 7 of the large diameter part 5a. Openings 17, 17 are limited by end surfaces or cams 16. A locking spring 10 is guided into the openings 17, 17 and it has two legs 14, 14', which engage into the respective openings 17. The ends 15 of the legs are bent outwardly and are guided by surfaces 16 which are beveled outwardly. A web or shoulder 11 of the spring 10 connects the two legs 14, 14'. With locking spring 10 mounted in place in connecting part 3, the shoulder 11 remains outside the main portion of connecting part 3, but within a circular cover ring 13. A pushbutton 12 is guided for radial motion in an opening 13a which is provided in cover ring 13 and located opposite shoulder 11. The two legs 14, 14' are urged inwardly toward each other by the resilience of locking spring 10.

Figure 2:
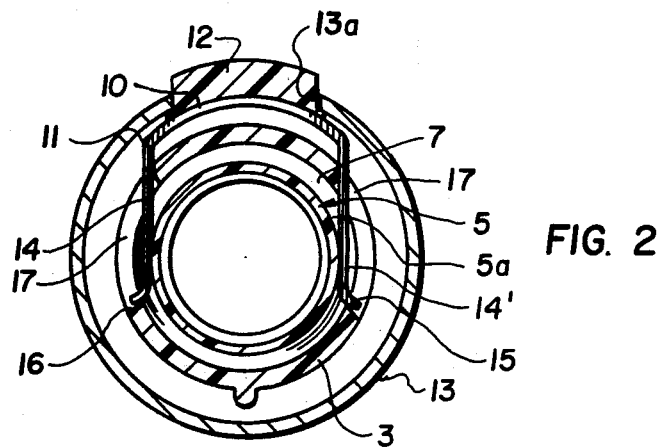
FIG. 2 is a section taken along the line A—B of FIG. 1 indicating a locked position of the quick coupling connection.
Figure 3:
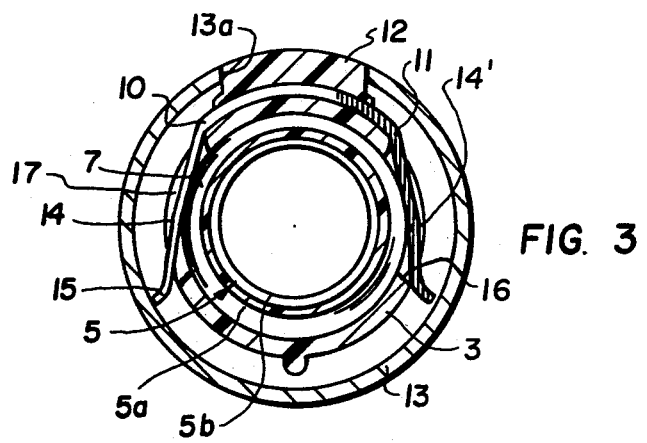
FIG. 3 is a view similar to FIG. 2 indicating the locking spring in position to lock the connecting apparatus to the respiratory device.

FIG. 2 shows the effected connection, with connecting tube 5 completely introduced in locked position with spring legs 14 and 14' locked in groove 7. While connecting tube 5 is introduced, neck portion 5b pushes the two legs 14, 14' apart, outwardly. As soon as neck 5b abuts against the respective matching surface in connecting part 3, groove 7 comes into a position alongside pushed-apart legs 14, 14'. Because of the resilience of spring 10, legs, 14' snap into groove 7 thereby locking the two connecting parts 3 and 5 with each other. In this position, the two connecting parts are sealed against each other by seal 20, but the lungs demand valve communicating with the source of nutritive gas remains rotatable, due to circular groove 7. Simultaneously with the locking, by the motion of leg ends 15 sliding on the abutting surfaces 16, locking spring 10 is pushed back outwardly, in the direction of cover ring 13, into its initial position, whereby, pushbutton 12 is also pushed to the outside by the shoulder portion 11 of spring 10.

To unlock the connection, pushbutton 12 and, thereby, locking spring 10, are pressed down in the direction of the axis of the connecting parts. This makes leg ends 15 move on the surfaces 16 outwardly. Legs 14, 14' thus spread apart clear groove 7 of connecting tube 5. Connecting tube 5 and, thereby, lungs demand valve 4 can now be removed from connecting part 3. Upon releasing pushbutton 12, both the pushbutton and locking spring 10 return into their initial positions.

While a specific embodiment of the invention has been shown and described in detail to illustrate the application of the principles of the invention, it will be understood that the invention may be embodied otherwise without departing from such principles.

What is claimed is:

1. A quick connecting construction for a respiratory device, comprising a respiratory device having a tubular breathing connection with a cylindrical receiving recess for accessory apparatus, an accessory apparatus having a tubular portion slidably inserted into the cylindrical receiving recess and having an exterior surface with an annular locking groove, said respiratory device having a tubular cover member overlying said tubular portion of said accessory apparatus and having an exterior side wall with an actuator receiving slot therein, a U-shaped locking spring having a web portion with an actuating part engaged in the actuator receiving slot of said tubular cover member, said locking spring having first and second opposite leg portion connected to respective sides of said web portion, said tubular breathing connection of said respirator device having a locking slot defined in respective opposite sides thereof and with an edge defining an end of the slot opposite to the spring web portion and also opposite to the actuator receiving slot which forms a cam surface, said spring leg portions being engaged into respective tubular portion slots and into the locking groove to hold said tubular portion of said connecting device to said respirator device, the respective ends of said springs being engaged on said cam edges of the respective slots whereby upon movement of said actuator part in a downward direction toward said cam edges move the ends of said springs along said cam edges to force them out of said groove and release said tubular portion of said connecting device wherein said respirator device comprises a breathing mask, said tubular breathing connection of said breathing mask having an inner diameter part and an outer diameter part of a greater diameter than said inner diameter part and with an intermediate part between said outer and inner diameter part bevelled inwardly from the outer diameter part to the inner diameter part, said accessory apparatus comprising a lungs control device having said tubular portion of an exterior configuration corresponding to the interior configuration of said cylindrical receiving recess and having an intermediate diamteer portion which abuts against the intermediate diameter portion of said cylindrical receiving recess when it is fully inserted so as to align said annular locking groove with said spring leg portions.

2. A quick connecting construction for a respiratory device, according to claim 1, wherein said cover member is an annular ring having a slot therein through which said actuating part extends, said actuating part comprising a pushbutton.

3. A quick connecting construction for a respiratory device, according to claim 1, wherein said cam edges diverge outwardly so as to force said legs outwardly when said actuating member is moved toward said tubular portion of said connecting device.

* * * * *